US012683955B2

(12) United States Patent
Sharma et al.

(10) Patent No.: US 12,683,955 B2
(45) Date of Patent: **\*Jul. 14, 2026**

(54) EMBEDDING CREDENTIALS IN NETWORK ADDRESSES

(71) Applicant: Visa International Service Association, San Francisco, CA (US)

(72) Inventors: Varun Sharma, Foster City, CA (US); Hanna Endrias, Washington D.C., DC (US); Ajit Vilasrao Patil, Singapore (SG); Nandakumar Kandaloo, Mountain View, CA (US)

(73) Assignee: Visa International Service Association, San Francisco, CA (US)

( \* ) Notice: Subject to any disclaimer, the term of this patent is extended or adjusted under 35 U.S.C. 154(b) by 58 days.

This patent is subject to a terminal disclaimer.

(21) Appl. No.: 18/675,799

(22) Filed: May 28, 2024

(65) Prior Publication Data

US 2024/0348609 A1 Oct. 17, 2024

Related U.S. Application Data

(60) Division of application No. 17/829,709, filed on Jun. 1, 2022, now Pat. No. 12,021,869, which is a
(Continued)

(51) Int. Cl.
*H04L 9/40* (2022.01)
*H04L 45/00* (2022.01)
(Continued)

(52) U.S. Cl.
CPC ............ *H04L 63/083* (2013.01); *H04L 45/72* (2013.01); *H04L 61/50* (2022.05);
(Continued)

(58) Field of Classification Search
CPC ..... H04L 63/083; H04L 61/50; H04L 67/535; H04L 63/0884; H04L 45/72; H04L 61/20
See application file for complete search history.

(56) References Cited

U.S. PATENT DOCUMENTS

| 11,032,247 B2 | 6/2021 | Newell et al. |
| 11,381,560 B2 | 7/2022 | Sharma et al. |
| 2022/0172171 A1 \* | 6/2022 | Skala ................... G06Q 10/107 |

FOREIGN PATENT DOCUMENTS

GB 2367986 A 4/2002

OTHER PUBLICATIONS

U.S. Appl. No. 16/532,309 , "Notice of Allowance", Mar. 4, 2022, 9 pages.

(Continued)

*Primary Examiner* — Esther B. Henderson
(74) *Attorney, Agent, or Firm* — Kilpatrick Townsend & Stockton LLP

(57) ABSTRACT

A technique for embedding and utilizing credentials in a network address may include requesting a network address for a client device by providing an account identifier to a server computer associated with a service provider. A network address that is mapped to the account identifier can be assigned to the client device. The network address may include a routing prefix field and a network interface identifier field. The routing prefix field may include an issuer identifier of an issuer of the account, and the network interface identifier field may include an interface identifier that maps to the account identifier. By embedding credentials such as an account identifier in the network address, the actual account identifier need not be transmitted to perform actions on the account.

20 Claims, 7 Drawing Sheets

Related U.S. Application Data continuation of application No. 16/532,309, filed on Aug. 5, 2019, now Pat. No. 11,381,560.

(51) Int. Cl.
| | | |
|---|---|---|
| *H04L 61/50* | (2022.01) |
| *H04L 67/50* | (2022.01) |
| *H04L 67/303* | (2022.01) |
| *H04L 101/35* | (2022.01) |

(52) U.S. Cl.
CPC ........ *H04L 63/0884* (2013.01); *H04L 67/535* (2022.05); *H04L 67/303* (2013.01); *H04L 2101/35* (2022.05)

(56)                    References Cited

OTHER PUBLICATIONS

U.S. Appl. No. 17/829,709 , "Non-Final Office Action", Sep. 14, 2023, 11 pages.
U.S. Appl. No. 17/829,709 , "Notice of Allowance", Feb. 28, 2024, 5 pages.

* cited by examiner

100

302             304          306

| ROUTING PREFIX | SUBNET ID | NETWORK INTERFACE ID |
|---|---|---|

| ISSUER ID | INTERFACE ID RANGE | ACCT CHARACTERISTICS |
|---|---|---|
| 40001 | 000000000 to 000999999 | ACCT TYPE 1 / PLATFORM 1 |
| 40001 | 001000000 to 001999999 | ACCT TYPE 2 / PLATFORM 1 |
| 40001 | 002000000 to 002999999 | ACCT TYPE 3 / PLATFORM 1 |
| 40001 | 003000000 to 003999999 | ACCT TYPE 1 / PLATFORM 2 |

402      404          406

600

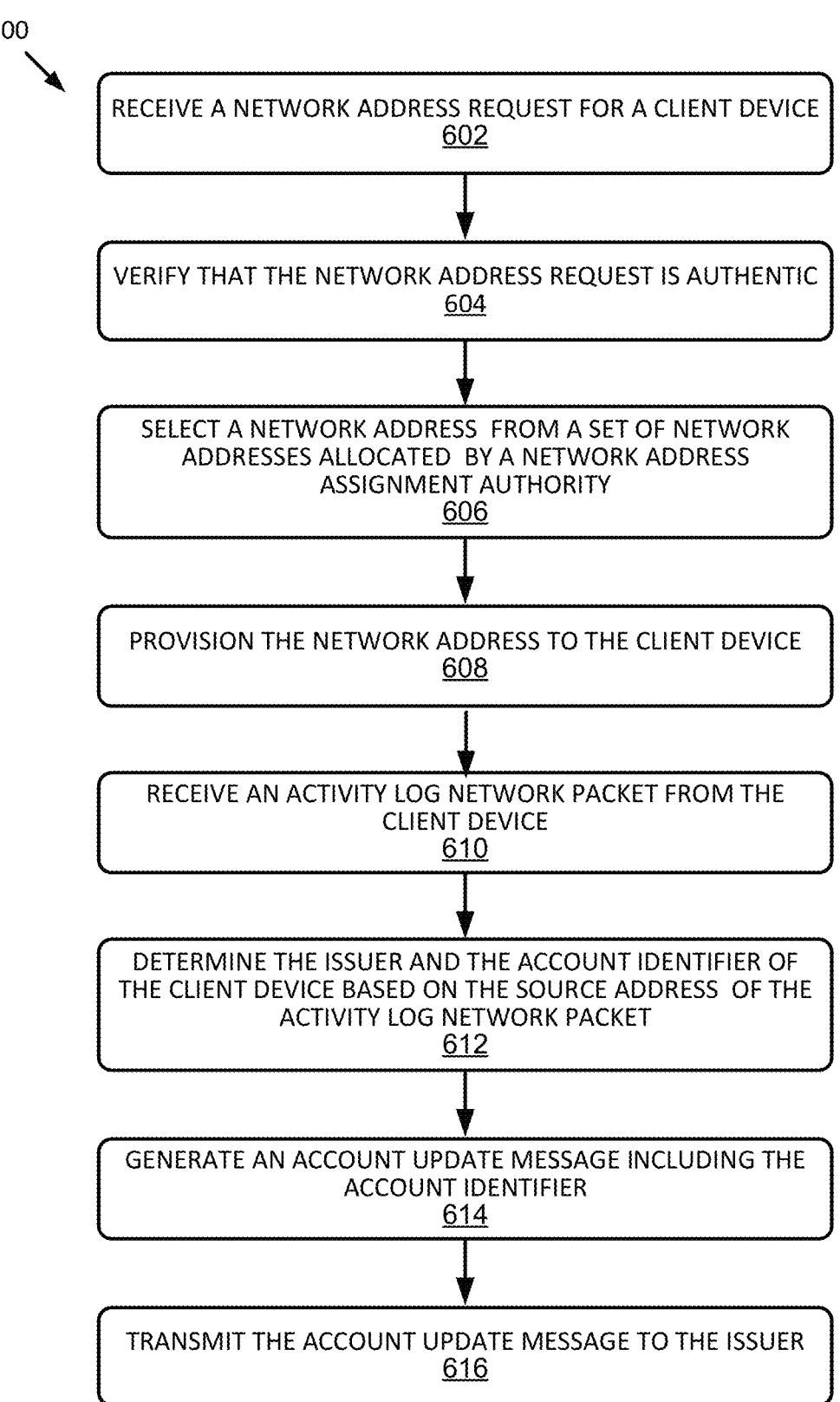

RECEIVE A NETWORK ADDRESS REQUEST FOR A CLIENT DEVICE
602

VERIFY THAT THE NETWORK ADDRESS REQUEST IS AUTHENTIC
604

SELECT A NETWORK ADDRESS  FROM A SET OF NETWORK ADDRESSES ALLOCATED  BY A NETWORK ADDRESS ASSIGNMENT AUTHORITY
606

PROVISION THE NETWORK ADDRESS TO THE CLIENT DEVICE
608

RECEIVE AN ACTIVITY LOG NETWORK PACKET FROM THE CLIENT DEVICE
610

DETERMINE THE ISSUER AND THE ACCOUNT IDENTIFIER OF THE CLIENT DEVICE BASED ON THE SOURCE ADDRESS  OF THE ACTIVITY LOG NETWORK PACKET
612

GENERATE AN ACCOUNT UPDATE MESSAGE INCLUDING THE ACCOUNT IDENTIFIER
614

TRANSMIT THE ACCOUNT UPDATE MESSAGE TO THE ISSUER
616

FIG. 6

COMMUNICATION DEVICE 900

MEMORY 902

APPLICATION ENVIRONMENT 910

CLIENT DEVICE APP 912

NETWORK ADDRESS 918

TOKEN 914

ACCT IDENTIFIER 916

OS 920

APIS 922

DEVICE HARDWARE 904

PROCESSOR 905

USER INTERFACE 906

DISPLAY 907

COMMUNICATION SUBSYSTEM 909

CONTACTLESS INTERFACE 908

EMBEDDING CREDENTIALS IN NETWORK ADDRESSES

CROSS-REFERENCES TO RELATED APPLICATIONS

This application is a Continuation Application of U.S. patent application Ser. No. 17/829,709, filed on Jun. 1, 2022, which is a continuation application of U.S. patent application Ser. No. 16/532,309, filed on Aug. 5, 2019, now U.S. Pat. No. 11,381,560, which are herein incorporated by reference in their entirety for all purposes.

BACKGROUND

When a user utilizes an account to access services and/or information, the user may be required to communicate credentials such as an account identifier to a recipient to properly identify the account of the user. For a communication transmitted through a network such as the Internet, the account identifier is typically provided in the data payload of a network packet. However, transmission of credentials such as an account identifier in the data payload of a network packet poses a data security threat, because the account identifier carried in the data payload of a network packet is susceptible to interception by other parties on the network.

BRIEF DESCRIPTION OF THE DRAWINGS

FIG. 6 illustrates a flow diagram of a process for provisioning and processing credentials embedded in a network address, according to some implementations.

DETAILED DESCRIPTION

Figure 1:
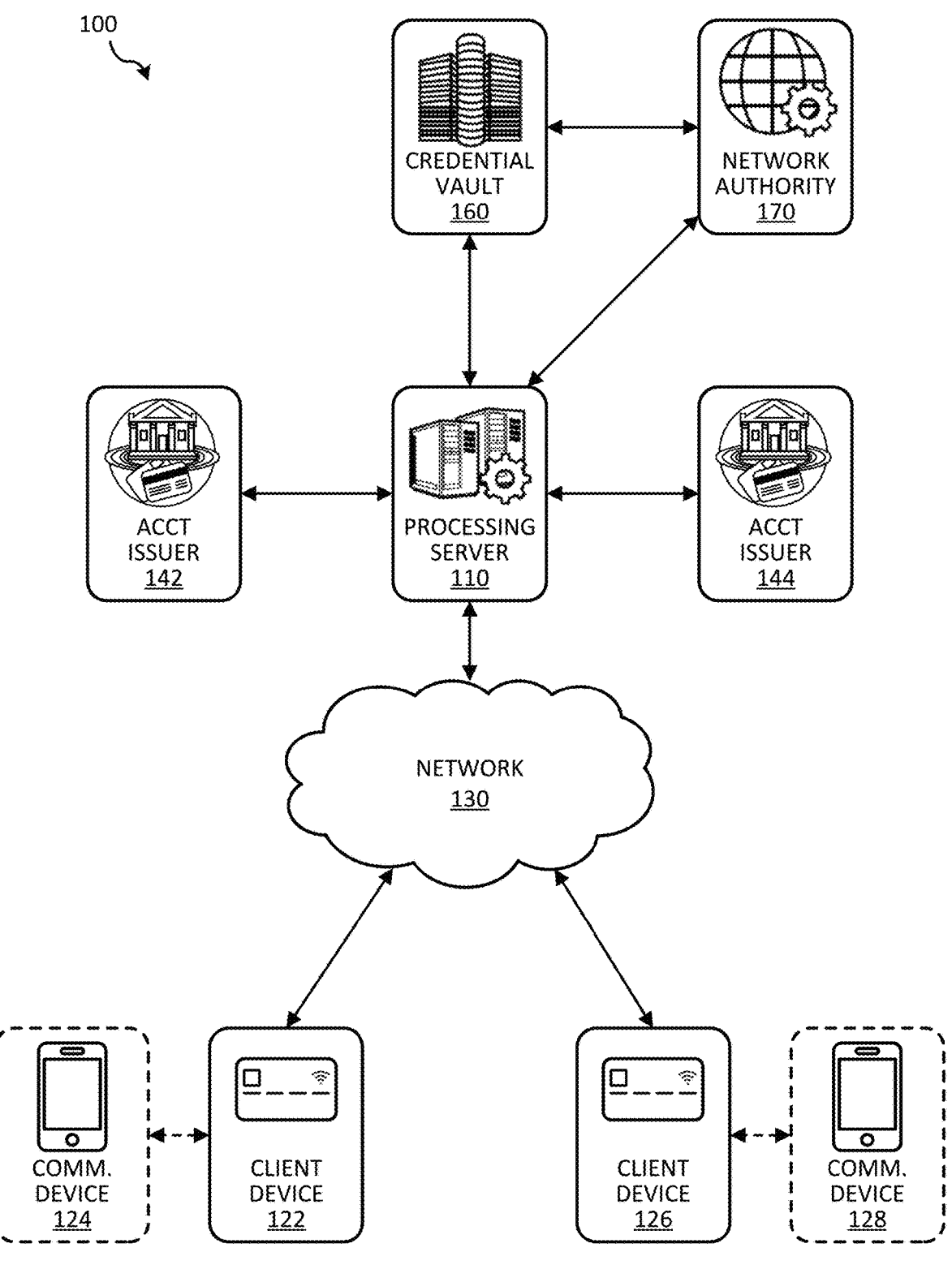
FIG. 1 illustrates a block diagram of a system that utilizes credentials embedded in network addresses, according to some implementations.

A network packet such as an Internet protocol (IP) packet may include a packet header and a data payload. The packet header may contain a source address to identify the sender device, and a destination address to identify and route the network packet to the intended recipient device. The data payload may carry application data used by the recipient device. For example, when a user is utilizing a user's account to access services and/or information, the data payload of the network packet sent to the service provider may carry credentials such as a user's account identifier.

As devices connected to the Internet grows, the length or number of bits in the network address of network packets has also been expanded to accommodate the increasing number of connected devices. For example, in Internet protocol version 4 (IPv4), the number of address bits is limited to 32 bits, whereas in Internet protocol version 6 (IPv6), the number of address bits has been expanded to 128 bits. The expansion in the length of network address also creates an opportunity for additional information to be embedded into the network address itself. The techniques disclosed herein embed credentials such as an account identifiers in the network address. By embedding credentials in the network address of a network packet, the credentials no longer need to be carried in the data payload of the network packet. As a result, less data need to be transmitted across the network to improve network efficiency. Furthermore, as credentials are expected to be carried in the data payload and not in the packet header, an unauthorized party intercepting the network packet and attempting to compromise the credentials is unlikely to examine the packet header to obtain the credentials. Accordingly, embedding credentials in the network address of a network packet can also improve the data security of transmitting credentials over a network.

Prior to discussing various implementations of the network addressing techniques, a description of some terms may be helpful in understanding implementations of the techniques disclosed herein.

A communication device may be a device that includes one or more electronic components (e.g., an integrated chip) that can communicate with another device. A portable communication device may be one form of a communication device that can be transported and operated by a user, and can be referred to herein as a client device or a target device. A portable communication device may provide remote communication capabilities to a network, and can be configured to transmit and receive data or communications to and from other devices. A portable communication device may be in the form of a mobile device such as a mobile phone (e.g., smart phone, cellular phone, etc.), tablets, portable media player, personal digital assistant devices (PDAs), wearable computing device (e.g., watch), electronic reader device, etc., or in the form of a card (e.g., smart card) or a fob, etc. Examples of portable communication devices may also include portable computing devices (e.g., laptop, netbook, ultrabook, etc.). A portable communication device may also be in the form of an Internet of Things (IoT) device, or a vehicle (e.g., an automobile such as car) equipped with communication and/or network connectivity capabilities.

A server computer or processing server may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client devices.

A token may be a substitute for sensitive information. A token may refer to information that can be transmitted or use in place of the sensitive information. For example, a token can be a substitute for sensitive information such as a real account identifier, and the token may be used in place of the real account identifier to conduct access the account. In the payment context, a payment token may be an identifier for a payment account and act as a substitute for the real account identifier (e.g., a primary account number (PAN)). A token may include a series of alphanumeric characters that may be used as a substitute for an original account identifier. For example, a token "4900 0000 0000 0001" may be used in place of a primary account number (PAN) "4147 0900 0000 1234." In some implementations, a token may be format preserving and may have a numeric format that conforms to the account identifiers used in existing payment processing networks (e.g., ISO 8583 financial transaction message format). In some implementations, a token may be used in place of a PAN to initiate, authorize, settle or resolve a payment transaction or represent the original credential in other systems where the original credential would typically be provided. In some implementations, a token can be generated in a manner such that the recovery of the original sensitive information (e.g., PAN) may not be algorithmically or computationally derived. For example, a token may include random numbers so that the PAN associated with the token is not computationally derivable from the token. A lookup table may be used to associate a PAN and a corresponding token. In some implementations, a token can be a non-payment token that is used as a substitute for other types of sensitive information.

In some implementations, the format of the token may be include some indication that can be used by a receiving entity to identify the received information as a token. In some implementations, the format of the token may also allow a receiving entity to identify the issuer associated with the token. For example, the format of the token may include a token issuer identifier to identify the issuer of the token. For instance, for a payment token, the token issuer identifier may be associated with an issuer's BIN of the underlying PAN in order to support the existing payment flows. The token issuer identifier may be a different number than the issuer's BIN and may be static. For example, if the issuer's BIN for an issuer is 412345, the token issuer identifier can be 528325, and this number may be static for all tokens issued from or for that issuer.

In some implementations, tokens may be device-specific such that each communication device associated with a piece of sensitive information may be provisioned with a particular token that is different on each communication device, even though the tokens are associated with to the same underlying piece of sensitive information. As such, a piece of sensitive information may have multiple tokens associated with it. In some instances, if a token is used by a different device than the device that the token was provisioned to, usage of that token from the different device may be denied. Accordingly, device information may be stored in the token vault and used to ensure that the device using the token is associated with the token that was provisioned to the particular device. This can provide additional security because network token systems have additional information to validate in order to control the use of sensitive information in the system.

An issuer may typically refer to an entity (e.g., a bank) that maintains an account (e.g., a financial account) for a user. The account can be enrolled in an application installed on a communication device of the user to allow the user to conduct transactions on the account via the communication device. A merchant may typically be an entity that engages in transactions and can sell goods or services, or provide access to goods or services. An acquirer may typically be an entity (e.g., a commercial bank) that has a business relationship with a particular merchant or other entity. Some entities can perform both issuer and acquirer functions. Some implementations may encompass such single entity issuer-acquirers.

An access device may be any suitable device for communicating with a merchant computer or transaction processing network (e.g., payment processing network), and for interacting with a consumer communication device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, websites, and the like. An access device may use any suitable contact or contactless mode of operation to send or receive data from, or associated with, a consumer communication device. In some implementations, where an access device may comprise a POS terminal, any suitable POS terminal may be used and may include a reader, a processor, and a computer-readable medium. A reader may include any suitable contact or contactless mode of operation. For example, exemplary readers can include radio frequency (RF) antennas, optical scanners, bar code readers, or magnetic stripe readers to interact with a consumer communication device.

An authorization request message may be an electronic message that is sent to request authorization for a transaction. The authorization request message can be sent to a payment processing network and/or an issuer of a payment card. An authorization request message according to some implementations may comply with ISO 8583, which is a standard for systems that exchange electronic transaction information associated with a payment made by a user using a payment device or payment account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An authorization response message may be an electronic message reply to an authorization request message. The authorization response message can be generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant computer that indicates approval of the transaction. The code may serve as proof of authorization. As noted above, in some implementations, a payment processing network may generate or forward the authorization response message to the merchant.

Provisioning may include a process of providing data for use. For example, provisioning may include providing, delivering, or enabling a token on a communication device. Provisioning may be completed by any entity within or external to the transaction system. For example, in some implementations, tokens may be provisioned by an issuer or a transaction processing network onto a mobile device. The provisioned tokens may have corresponding token data stored and maintained in a token vault or token registry. In some implementations, a token vault or token registry may generate a token that may then be provisioned or delivered to a device. In some implementations, an issuer may specify a token range from which token generation and provisioning can occur. Further, in some implementations, an issuer may generate and notify a token vault of a token value and provide the token record information (e.g., token attributes) for storage in the token vault.

A real or actual account identifier may include an original account identifier associated with a payment account. For example, a real account identifier may be a primary account number (PAN) issued by an issuer for a card account (e.g., credit card, debit card, etc.). For instance, in some implementations, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

Tokenization is a process by which sensitive data is replaced with substitute data. For example, a real account identifier (e.g., a primary account number (PAN)) may be tokenized by replacing the real account identifier with a substitute number that may be associated with the real account identifier. Further, tokenization can be applied to any other information to substitute the underlying information with a token. Token exchange or de-tokenization is a process of restoring the data that was substituted during tokenization. For example, a token exchange may include replacing a payment token with its associated primary account number (PAN). Further, de-tokenization or token exchange may be applied to any other information to retrieve the substituted information from a token. In some implementations, token exchange can be achieved via a transactional message, such as an ISO message, an application programming interface (API), or another type of web interface (e.g., web request).

A consumer may include an individual or a user that operates a communication device to conduct a transaction on an account or otherwise manage an account. The consumer may also be referred to as a cardholder, accountholder, or user.

A key may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include Advance Encryption Standard (AES), Data Encryption Standard (DES), Triple Data Encryption Standard/Algorithm (TDES/ TDEA), or other suitable algorithms. The key used in the cryptographic algorithm can be of any suitable lengths (e.g., 56-bit, 128-bit, 169-bit, 192-bit, 256-bit, etc.). In some implementations, a longer key length may provide a more secure encryption that is less susceptible to hacking.

A transaction processing system can be an example of a processing server and may include a network of one or more devices that can process and route transaction request messages. An exemplary transaction processing system may include data processing subsystems, networks, and operations used to support and deliver authorization services, exception file services, transaction scoring services, and clearing and settlement services. An exemplary transaction processing system may include VisaNet™. Transaction processing systems such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

FIG. 1 illustrates a block diagram of a system 100 that utilizes credentials embedded in network addresses, according to some implementations. System 100 may include multiple network-enabled client devices such as client device 122 and client device 126 that can communicate with each other and with a processing server 110 via a network 130 such as the Internet. In some implementations, any of client devices 122 and 126 can be a network-enabled portable card that a user can carry, for example, in a wallet. Client device 122 can be tethered to a communication device 124 such as a smart phone to provide a more convenient user interface to control and access the features and functionalities of client device 122. Similarly, client device 124 can also be tethered (e.g., using a short range communication protocol such as Bluetooth, etc.) to a communication device 128 to provide a more convenient user interface to control and access the features and functionalities of client device 124. Any of client devices 122 and 126 can also have its own user interface that is sufficient to allow a user to access the features and functionalities of the client device. In some implementations, any of client devices 122 and 126 can alternatively be implemented as a client application installed on a communication device. In such implementations, the client device need not be tethered to another communication device.

Each of client devices 122 and 124 can be associated with an account, and be utilized by a user to perform actions on the account such as accessing services and/or information associated with the account. Examples of different types of account that can be associated with a client device may include online or web services accounts (e.g., email, social media accounts, etc.), access accounts (e.g., facilities, building, transportation accounts, etc.), financial accounts (e.g., credit card, banking, mobile wallet, brokerage accounts, etc.), or other types of accounts associated with a service provider. The accounts associated with client devices 122 and 124 can be issued by the same or different issuers. For example, the account of client device 122 can be issued by an account issuer 142, and the account of client device 124 can be issued by a different account issuer 144. To utilize the client device to perform an action on the account associated with the client device, a user may operate the client device to interact with another device to provide credentials associated with the account to that device. For example, in implementations in which an account identifier is obfuscated and embedded in a network address, a client device may send a network packet that contains the client device's network address to a target device (e.g., another client device, an access device, a processing server, etc.) to effect a certain action on the account. Because the account identifier is embedded in the network address, the client device need not send the actual account identifier in the data payload of the network packet.

Processing server 110 can be a server computer operated by a service provider that provides account services for the accounts of client devices 122 and 124. For example, processing server 110 can perform account processing services such as provisioning client devices 122 and 124 with account credentials (e.g., account identifier, token, network address, etc.). Processing server 110 can also perform authentication and/or authorization services on behalf of the accounts. Additionally, processor server may also perform update services on the accounts. By way of example, processing server 110 can be operated by a transaction processor that provides authorization and settlement/clearing services on transactions conduct with the accounts.

Processing server 110 may interact with various entities to provision client devices, and to service the accounts associated with them. For example, processing server 100 may request a set of network addresses from a network authority 170 such as the Internet Assigned Numbers Authority (IANA) who oversees global IP address allocation. Network authority 170 may assign or dedicate a set of network addresses or network address ranges to the service provider associated with processing server 110. Processing server 110 may select a network address from the addresses allocated for the service provider of processing server 110, map the selected network address to an account identifier, and provision a client device with that network address. In some implementations, processing server 110 may also provide tokenization services, and may generate and issue a token to a client device. Depending on the context of how the client device is being utilized, the network address or the token provisioned to the client device can be used as a substitute for the actual account identifier of the account such that the account identifier need not be transmitted over network 130 to affect actions on the underlying account.

Processing server 110 may include or be communicatively coupled to a credential vault 160. Credential vault 160 may store a mapping of corresponding account identifiers, tokens, and network addresses assigned to client devices by processing server 110. When an action is performed on an account or otherwise require processing sever 110 to service the account, processing server may receive a request from a client device that includes the network address or token, but not the account identifier. In such scenarios, processing server 110 may look up the account identifier associated with the network address or token from credential vault 160, and convert the request to include the actual account identifier mapped to the client device. Processing server 110 may then continue to service the account using the actual account identifier. For example, in some implementations, processing server 110 may receive a request from a client device to update an account to reflect an action performed on the account. The request may include a network address of the client device but not the actual account identifier. Processing server 110 may access credential vault 160 and convert the network address into the actual account identifier. Processing server 110 may then send an account update message with the actual account identifier to the corresponding account issuer to update the account.

Figure 2:
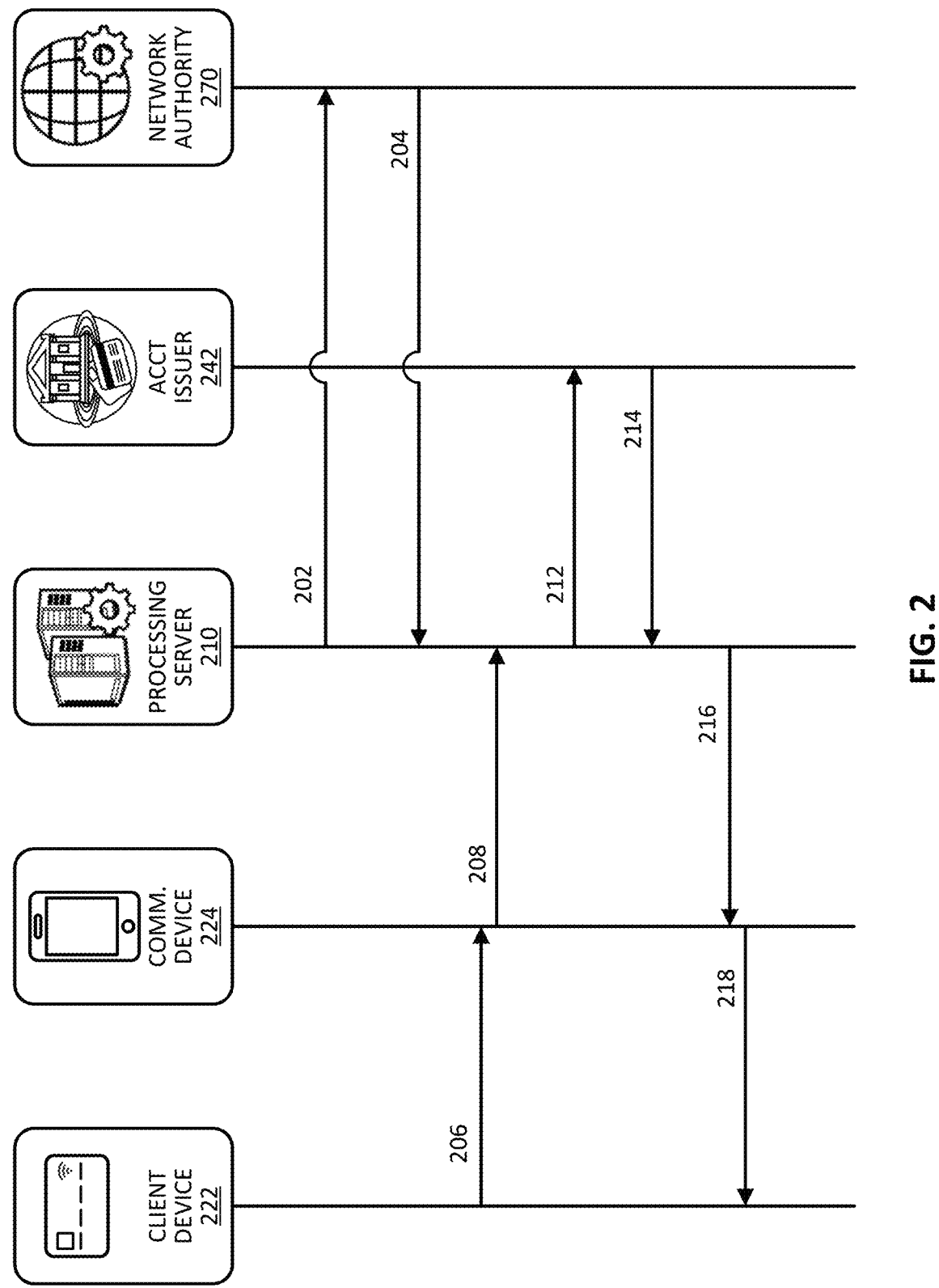
FIG. 2 illustrates a communication flow diagram of a provisioning process, according to some implementations.

FIG. 2 illustrates a communication flow diagram of a provisioning process, according to some implementations. At operation 202, processing server 210 may submit a request to network authority 270 to obtain a set of network addresses to allocate to processing server 210. In some implementations, processor server 210 may request a particular number of network addresses based on, for example, the processing capacity of processing server 210. For example, if processing server 210 is expected to service up to one million different accounts, processing server 210 may request one million network addresses from network authority 270. In some implementations such as those in which the network address adhere to the Internet protocol such as IPv6, the IP addresses allocated to processing server 210 can be dedicated to processing server 210 such that these addresses are not reused on the Internet. In this manner, the IP addresses allocated to processing server 210 will not interfere with the global routing of Internet traffic to and from existing IP addresses.

At operation 204, network authority 270 may determine a set of network addresses to allocate to processing server 210. The set of network addresses may include one or more address ranges. In some implementations, the network address may include a routing prefix field, a subnet identifier field, and an interface identifier field. Individual account identifiers can be obfuscated in the interface identifier field, and issuer identifiers can be obfuscated in the routing prefix field. Thus, depending on the number of issuers supported by processing server 210, network authority 270 may allocate that number of specific routing prefixes to processing server 210. For each allocated routing prefix, processing server 210 can assign network addresses starting with the specific routing prefix to accounts issued by the corresponding issuer.

At operation 207, a client device 222 can be activated by establishing a connection to communication device 224, and initiating a provisioning process to obtain a network address from processing server 210 via communication device 224. In some implementations, client device 222 can be issued with a preloaded account identifier. In some implementations, an application on communication device 224 may detect the presence of client device 222, and may request a user to provide an account identifier that the user would like to use for provisioning client device 222. Once an account identifier for client device 222 has been determined, communication device may request the user to provide additional security data such as authentication information to verify that the user is the proper owner of the account. The security data may include personal identification information such as a PIN or other information that a user previously registered with the issuer when the user obtained the account.

At operation 208, communication device 224 may initiate a network address request on behalf of client device 222. The network address request may include the account identifier of the account associated with the client device and other account identifying information such as information to identifier the issuer of the account. The network address request may also include security data that the issuer of the account may require to verify the authenticity of the account. In some implementations, communication device 224 may send the network address request to processing server 210 without an intermediary entity. Alternatively, communication device 224 may send the network address request to processing server 210 via a trusted requester (not shown) such as an operating system provider, mobile network provider, or communication device provider.

At operation 212, processor server 210 may verify that the account identifier in the network address request is a valid account supported by processing server 210, and forward the network address request to account issuer 242 to verify the authenticity of the network address request. Processing server 210 may determine the issuer, for example, by examining the account information provided in the network address request. In some implementations, processing server 210 may also provide additional information to account issuer 242 to facilitate the issuer verification process. The additional information may include account activity data such as the number of prior provisioning requests that have been processed for this account, and/or device information of communication device 224 and/or client device 222 to verify that these devices belong to the same owner as the account.

At operation 214, account issuer 242 may perform an issuer verification process on the network address request. This may include verifying that the account identifier corresponds to a valid account in good standing, the security data such as a PIN and other personal identification information submitted with the request corresponds to the information previously registered with account issuer 242, the communication device 224 and/or client device 222 belong to the same owner as the account based on previously registered device information, and/or there are no suspicious activity on the account such as an excessive number of previously received provisioning requests, etc. Once account issuer 242 has verified the account and the network address request, account issuer 242 may send a provisioning approval message to processing server 210 to indicate that processing server 210 can proceed with provisioning client device 222 with a network address. If the network address request is not verified, account issuer 242 may send a provisioning denial message to processing server 210 to terminate the provisioning process.

At operation 216, processing server 210 may select a network address from the network addresses allocated to processing server 210 by network authority 270. As mentioned above, the network address may include a routing prefix field and an network interface identifier field, and an issuer identifier can be embedded as a routing prefix, and the account identifier can be embedded as an interface identifier in the network interface identifier field of the network address. For example, processing serve 210 may select a network address having a routing prefix that corresponds to the issuer of the account being provisioned. To obfuscate the account identifier in the network address, processing server 210 may randomly select an interface identifier, and map the selected interface identifier to the account identifier. Processing server 210 may also sequentially select the next available interface identifier under the corresponding issuer in the order in which provisioning requests are received for this issuer, and map the next available interface identifier to the account identifier. In some implementations, processing server 210 may algorithmically derive the interface identifier from the account identifier. For example, processing server 210 may encrypt the account identifier to derive the interface identifier. Processing server 210 may also perform a series of mathematically operations on the account identifier to derive the interface identifier. Processing server 210 may then combine the routing prefix with the selected interface identifier to generate the network address for provisioning to client device 222. In some implementations, a subnet identifier can also be included in the generated network address. The subnet identifier can be used to embed other account information, or be used by processing server 210 to indicate processing control information when processing actions performed on the account.

In some implementations, processing server 210 may also provision a token to client device 222. A token can be used as a substitute for the account identifier in scenarios in which the network address may not be used for that purpose. This may occur, for example, when legacy infrastructure does not support embedding credentials in network addresses, or when client device 222 is being used in an environment in which client device 222 is communicating using a different mechanism than network packets. Processing server 210 may randomly select a token and map it to the account identifier, or derive the token algorithmically from the account identifier (e.g., using encryption or mathematical operations, etc.). Processing server 210 may then store the selected network address and/or token in a credential vault (not shown), and maintain a mapping of the network address and/or token with the account identifier.

At operation 216, processing server 210 may send the selected network address and/or token to communication device 224. At operation 218, communication device 224 may provision client device 222 with the received network address and/or token. This may include storing the network address and/or token in a secured memory of client device 222 such as a secure element, and may also include accessing a network communication stack of client device 222 to assign the received network address to client device 222. Once client device 222 has been provisioned with the network address and/or token, client device 222 can be used to perform actions on the account associated with client device 222. In some implementations, depending on the environment in which client device 222 is being used, client device may select between the actual account identifier, the token, and/or the network address to provide to another device to identify the underlying account associated with client device 222.

Figures 3, 4:
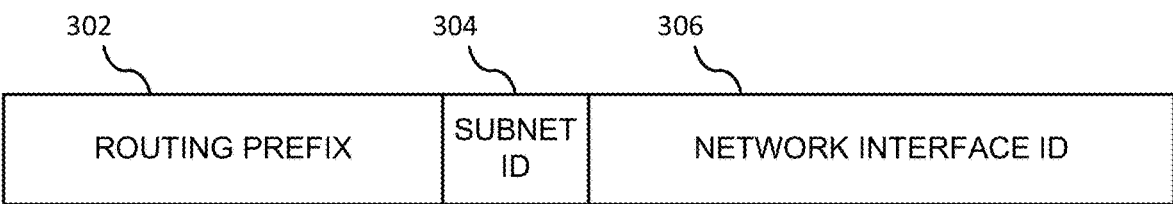
FIG. 3 illustrates a data structure of a network address, according to some implementations.
FIG. 4 illustrates the concept of account ranges, according to some implementations.

FIG. 3 illustrates the data structure of a network address, according to some implementations. The network address may include a routing prefix field 302, a subnet identifier field 304, and a network interface identifier field 306. For example, the network address can be a 128-bit IP address that adheres to the IPv6 protocol. Routing prefix field 302 can be a 48-bit field, subnet identifier field 304 can be a 16-bit field, and network interface identifier field 306 can be a 64-bit field. It should be understood that depending on the network in which the techniques disclosed herein are implemented, the number of bits in each field can be varied. The network address may also include one or more field not specifically described, or omit one or more fields described herein.

Routing prefix field 302 can be used by network equipment to properly identify the source or destination of a network packet, and to properly route the network packet to the intended recipient through a global network. In some implementations, an issuer identifier corresponding to an issuer of an account can be embedded in routing prefix field 302. As a processing server (e.g., processing server 110 or 210) may process accounts from different issuers, multiple distinct routing prefixes can be allocated to the processing server for assignment to client devices. When network equipment receives a network packet having a destination address that includes one of the allocated routing prefixes, the network equipment can determine that the network packet is intended for a client device provisioned by the processing server, and route the network packet to the proper client device as identified by the network address of the client device. In some implementations, the processing server may have its own assigned routing prefix to allow the client devices to send network packets to the processing server. In some implementations, in addition to an issuer identifier, a processor control record identifier and/or a processing station identifier can also be embedded into the routing prefix field 302. The processor control record identifier and/or a processing station identifier can be used to identify the proper processing server associated with a client device that supports servicing the account of the client device.

Subnet identifier field 304 can be used for various purposes. For example, subnet identifier field 304 can be used to define different categories or types of accounts under each issuer. The subnet identifier filed 304 can also be used to provide processing control information to define processing options when servicing the account associated with the client device. In some implementations, the number of bits in subnet identifier field 304 can be reduced to provide additional data bits for the routing prefix field 302 if additional distinct routing prefixes are needed for the system. The subnet identifier field 304 can also be optional and can be omitted to provide additional data bits for routing prefix field 302 and/or network interface identifier field 306.

Network interface identifier field 306 can be used to identify the specific client device that has been provisioned with the network address. Network interface identifier field 306 may contain an interface identifier that maps to the account identifier of the account associated with the client device. The interface identifier can be used to obfuscate the actual account identifier. In some implementations, the interface identifier for a particular account can be randomly selected by the processing server or be sequentially selected based on the order in which provisioning requests are received by the processing server. Alternatively, the interface identifier can be algorithmically derived by applying encryption and/or other mathematical operations on the actual account identifier. The interface identifier may also include one or more check bits that are used as a parity or checksum to verify the integrity of the interface identifier. In some implementations, the number of data bits in network interface identifier field 306 may allow for more than one billion accounts to be mapped to a distinct interface identifier.

FIG. 4 illustrates the concept of account ranges that can be implemented using the network addresses described herein, according to some implementations. For a particular issuer, a set of account ranges can be associated with the issuer. In the example shown in FIG. 4, an issuer may have an issuer identifier of "40001" that is embedded in the routing prefix field of network addresses associated with the issuer. This issuer may have four account ranges as shown. The first account range may span interface identifiers of "000000000" to "000999999"; the second account range may span interface identifiers of "001000000" to "001999999"; the third account range may span interface identifiers of "002000000" to "002999999"; and the fourth account range may span interface identifiers of "003000000" to "003999999". Each of these interface identifiers can be mapped to a distinct account identifier, and the account identifiers that map to the interface identifiers in an account range can be contiguous or non-contiguous depending on the mapping technique employed by the processing server.

Each account range can be associated with different set of account characteristics and/or product category. Although the combination of account characteristics for each account range is different from the other account ranges, different account ranges may share one or more common characteristics. For example, the first three account range may each correspond to a different account type, but share the same account platform. The first and fourth account ranges may share the same account type but correspond to different account platforms. In some implementations, different account types can be associated with different usage limits and/or services, and different account platforms can be associated with a different category of users. The set of account characteristics may also include other properties depending on the context of the accounts. By way of example, in the context of financial card accounts, an account type may correspond to different card levels such as classic, silver, gold, platinum, signature, etc., having different spending limits and/or account services. An account platform may correspond to a category of users such as consumers, merchants, businesses, etc. In some implementations, the account characteristics may also include a funding source type such as whether the account is a credit or debit account.

By utilizing account ranges to identify different characteristics of an account under an issuer, a processing server can readily determine the properties of the account from the network interface identifier field of the source address of a network packet by determining which account range the interface identifier belongs to. This can eliminate the need to have a separate field in the network address to indicate the account characteristics of a particular account.

Figure 5:
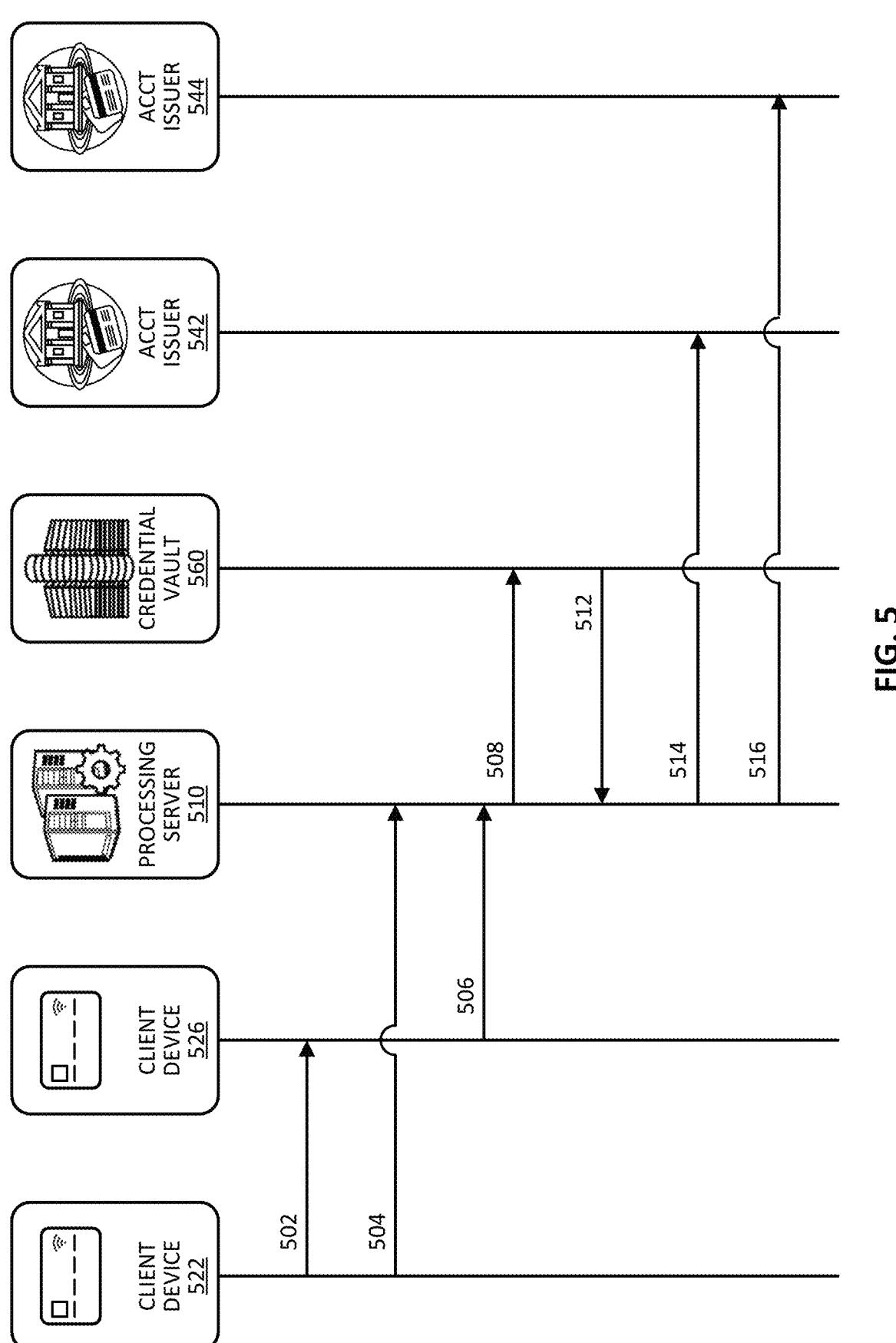
FIG. 5 illustrates a communication flow diagram of a process for performing an action on an account using a network address embedded with credentials, according to some implementations.

FIG. 5 illustrates a communication flow diagram of a process for performing an action on an account using a network address embedded with a credential, according to some implementations. In the example shown in FIG. 5, client devices 522 and 526 have previously been provisioned with respective network addresses that are associated with corresponding accounts. Client device 522 can be the initiating device, and client device 526 can be the target device 526. The action being performed on the account associated with client device 522 can be a transfer from that account to the target account associated with client device 526.

A user operating client device may initiate the action by selecting a target account as the intended recipient of the transfer. The account selection can be performed on a user interface of client device 522 or on a user interface of a communication device tethered to client device 522. The account selection can be carried out, for example, by a user inputting the network address of the target client device 526, selecting an alias such as identifying information (e.g., name, phone number, email, etc.) of the user of target client device 526 from a contacts list or address book that maintains a mapping of client devices and network addresses, clicking on a link or image encoded with the network address of target client device 526, etc. In implementations in which the transfer is of an amount of value, the user may indicate the amount to transfer on a user interface.

At operation 502, client device 522 may transmit an account activity network packet to target client device 526 to perform an action on the account of client device 522. In some implementations, the account activity network packet can be transmitted via a tethered communication device. The account activity network packet may conform to a network protocol such as IPv6, and may include a source address and a destination address in a packet header of the account activity network packet. The source address may correspond to the network address of client device 522, and the destination address may correspond to the network address of target client device 526. The source address of the account activity network packet may include an issuer identifier of issuer 542 of the account of client device 522 in the routing prefix field, and an interface identifier that maps to the account identifier of the account of client device 522 in the network interface identifier field. Similarly, the destination address of the account activity network packet may include an issuer identifier of issuer 544 of the target account of target client device 526 in the routing prefix field, and an interface identifier that maps to the target account identifier of the target account of target client device 526 in the network interface identifier field. The account activity network packet may also include additional information related to the action such as an amount to transfer in the data payload of the network packet. As the relevant information needed to identify the respective accounts are embedded into the source and destination addresses of the packet header, it is not necessary for the account activity network packet to include any account identifiers in the data payload of the network packet.

At operation 504, client device 522 may transmit an activity log network packet to processing server 510 to notify processing server 510 of the action performed on the account of client device 522. The activity log network packet may include a packer header that has a source address corresponding to the network address of client device 522 and a destination address corresponding to the network address of processing server 510. The data payload of the activity log network packet may include account activity data associated with the action performed on the account associated with client device 522 such as an alias identifying the target account and an amount being transferred to the target account.

At operation 506, target client device 526 may transmit an activity log network packet to processing server 510 to notify processing server 510 that target client device 526 has received an account activity network packet from client device 522 affecting the target account of target client device 526. The activity log network packet may include a packer header that has a source address corresponding to the network address of target client device 526 and a destination address corresponding to the network address of processing server 510. The data payload of the activity log network packet may include account activity data associated with the account activity network packet received from client device 522 such as an alias identifying the account of client device 522 and an amount being transferred to the target account.

At operation 508, processing server 510 may determine the issuer and the account identifier of the account associated with the client device 522 based on the source address in the packet header of the activity log network packet sent in operation 504. Processing server 510 may also determine the issuer and the account identifier of the target account associated with the target client device 526 based on the source address in the packet header of the activity log network packet sent in operation 506. For example, processing server 510 may send a query to credential vault 560 to lookup the corresponding issuers and account identifiers using the relevant network address fields in the source addresses of the activity log network packets. At operation 512, credential vault 560 may provide the corresponding issuers and account identifiers of client device 522 and target client device 526 back to processing server 510.

At operation 514, processing server 510 may generate an account update message including the account identifier of the account associated with client device 522 and processing information based on the account activity data in the activity log network packet received in operation 504, and send the account update message to issuer 542. For example, the processing information may include instructions to update the account of client device 522 to deduct the amount being transferred to the target account from the balance of the account of client device 522.

At operation 516, processing server 510 may generate another account update message including the account identifier of the target account associated with target client device 526 and processing information based on the account activity data in the activity log network packet received in operation 506, and send this account update message to issuer 544. For example, the processing information may include instructions to update the target account of target client device 526 to increment the balance of the target account by the amount being transferred.

Upon receiving the account update messages, issuers 542 and 544 can update the corresponding accounts to complete the action initiated by client device 522. In some implementations, for added security, processing server 510 may generated the account update messages only in response to the processing server 510 verifying that the activity log network packets in operations 504 and 506 correspond to each other. For example, processing server 510 may verify that the source address of the activity log network packet in operation 504 maps to the same account as the alias in the data payload of the activity log network packet in operation 506 identifying the account of client device 522. Processing server 510 may also verify that the source address of the activity log network packet in operation 506 maps to the same account as the alias in the data payload of the activity log network packet in operation 504 identifying the target account of target client device 526. Furthermore, processing server 510 may verify that the amount indicated in the data payload of the activity log network packets in operations 504 and 506 are the same. In some implementations, to further mitigate against unauthorized usage of the accounts (e.g., by IP spoofing), the transfer using network addresses as described above can have a ceiling limit such that only transfers in amount less than that ceiling limit are allowed. Additional measures to mitigate against unauthorized usage may include sending an alert if suspicious activities are detect such as an unusual larger number of transfers in a time window being executed to or from a particular network address.

In the example described above with reference to FIG. 5, the account activity network packet including the network addresses associated with the accounts is transmitted between two client devices to perform a transfer between the accounts. In some implementations, client device 522 may transmits the network address of client device 522 to an access device to conduct a transaction using the account associated with client device 522. Such a transaction flow may proceed as described below.

Client device 522 may provide its network address to an access device by sending a network packet to the access device. The access device may capture the source address of the network packet (which contains the network address of client device 522), and provide the network address of client device 522 to an acquirer associated with the access device. The acquirer may forward the network address of client device 522 to processing server 510. Processing server 510 may then access credential vault 560 to look up the account identifier mapped to the network address of client device 522. After processing server 510 obtain the account identifier, processing sever 510 may generate an authorization request message that includes the account identifier of the account associated with client device 522, and send the authorization request message to account issuer 542 to obtain authorization for the transaction. Upon approval, account issuer 542 may send an authorization response message indicating the transaction has been approved back to processing server 510, and processing serve 510 may forward the authorization response message to the acquirer and the access device.

FIG. 6 illustrates a flow diagram of a process 600 that can be performed, for example, by a server computer associated with a service provider for provisioning and processing credentials embedded in a network address, according to some implementations. At block 602, process 600 may begin by receiving a network address request for a client device. The network address request may include an account identifier of an account associated with the client device. At block 604, the network address request can be verified as being authentic. For example, the account identifier and authentication information can be forwarded to the issuer of the account for verification. At block 606, a network address conforming to a network protocol is selected from a set of network addresses allocated to the service provider by a network address assignment authority. At block 608, the selected network address is provisioned to the client device. The network address may include a routing prefix field and a network interface identifier field. The routing prefix field may include an issuer identifier of the issuer, and the network interface identifier field may include an interface identifier that maps to the account identifier. At this point, the client device can be used to perform actions on the account by providing the network address instead of the actual account identifier. In some implementations, a token that acts as a substitute for the account identifier associated with the client device may also be provisioned to the client device in response to verifying that the network address request is authentic.

At block 610, an activity log network packet can be received from the client device. The activity log network packet may include the network address of the client device as a source address in the packet header of the activity log network packet. The activity log network packet may also include account activity data associated with an action performed on the account of the client device in the data payload of the activity log network packet. The action performed on the account can be, for example, a transfer from the account of the client device to a target account associated with a target device. The action can be executed by the client device transmitting an account activity network packet to the target device. The account activity network packet may include the network address of the client device as a source address in the packet header of the account activity network packet, and a network address of the target device as a destination address in the packet header of the account activity network packet. In some implementations, the network address of the target device can be provisioned by the same server computer that provisioned the client device, and the network address of the target device can be selected from the set of network addresses allocated to the service provider associated with the server computer.

At block 612, the issuer and the account identifier of the account associated with the client device can be determined based on the source address in the packet header of the activity log network packet. At block 614, an account update message can be generated. The account update message may include the account identifier of the account associated with the client device, and processing information based on the account activity data received in the activity log network packet. At block 618, the account update message can be transmitted to the issuer to instruct the issuer to update the account associated with the client device based on the processing information.

In some implementations, for example, when the action being performed is a transfer to a target account, an activity log network packet can also be received from the target device. The target device may send the activity log network packet in response to the target device receiving the account activity network packet indicating the transfer from the client device. Similar to the activity log network packet from the client device, an issuer and an account identifier of the target account can be determined based on a source address of the activity log network packet from the target device. An account update message including the account identifier of the target account and processing information associated with the transfer can be generated and transmitted to the issuer of the target account to update the target account associated with the target device based on the processing information. In some implementations, to mitigate against unauthorized activity, the two account update messages can be generated in response to verifying that the activity log network packet from the client device and the activity log network packet from the target device corresponds to the same action being performed on the account associated with the client device. In other words, if either the accounts or the account activity data in the activity log network packets do not match up, the account update messages to the issuers are not generated to prevent the underlying accounts from being updated with potentially unauthorized activity.

Figure 7:
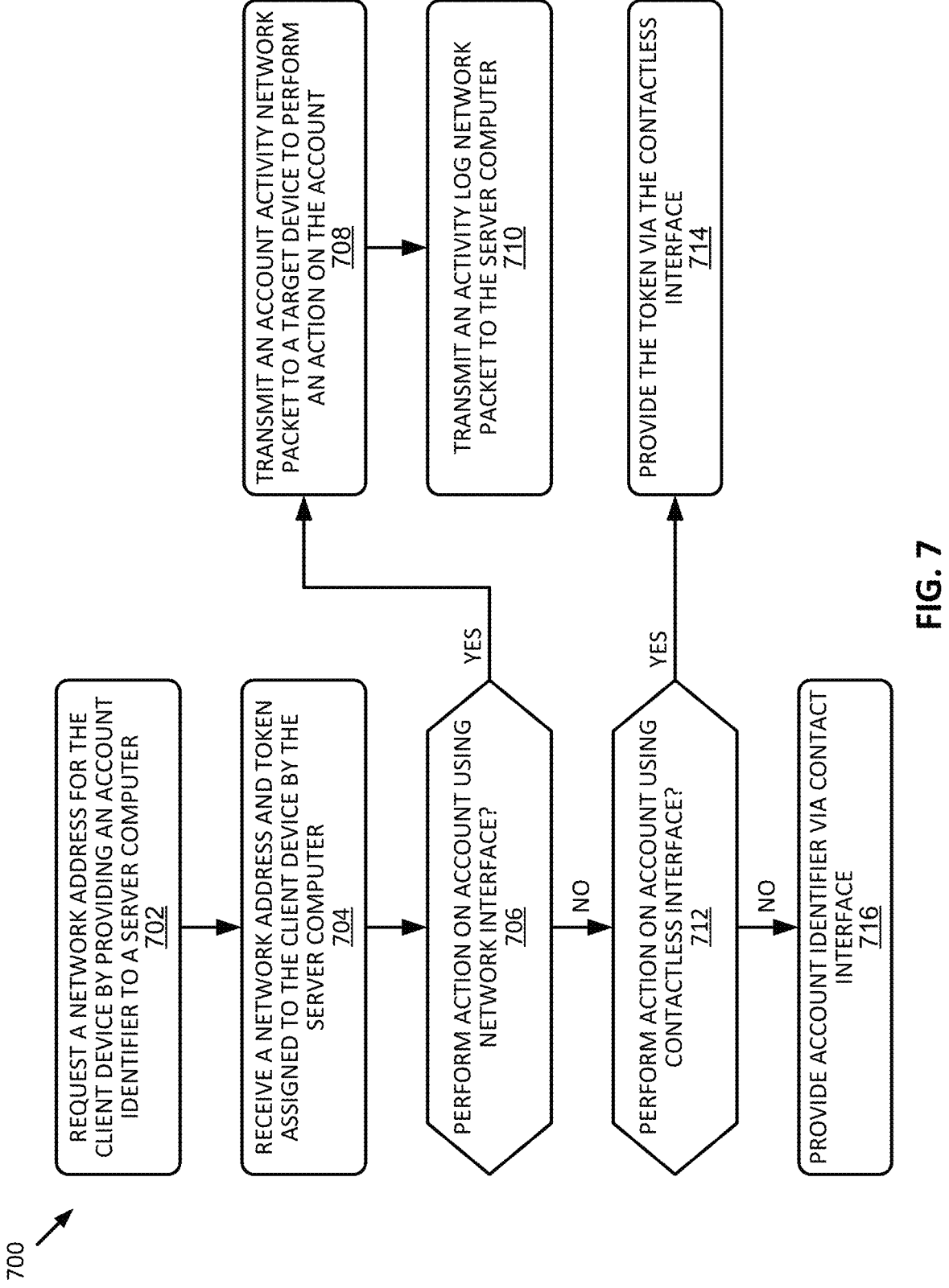
FIG. 7 illustrates a flow diagram of a process for utilizing credentials embedded in a network address, according to some implementations.

FIG. 7 illustrates a flow diagram of a process 700 that can be performed, for example, by a client device for utilizing credentials embedded in a network address, according to some implementations. At block 702, a network address for the client device can be requested by providing an account identifier identifying an account associated with the client device to a server computer associated with a service provider. At block 704, a network address assigned to the client device by the server computer can be received in response to the server computer verifying the account identifier and selecting the network address from a set of network addresses allocated to the service provider by a network address assignment authority. The network address may include a routing prefix field and a network interface identifier field. The routing prefix field may include an issuer identifier of an issuer of the account, and the network interface identifier field may include an interface identifier that maps to the account identifier. In some implementations, a token that can be used as a substitute for the account identifier can also be received from the server computer in response to the server computer verifying the account identifier in the request of block 702. The client device may store the network address, token, and/or account identifier in a secure memory of the client device.

At block 706, the client device may be used to perform an action on the account, and a determination is made as to whether the client device is using the network interface of the client device to perform the action. For example, if input is received on the user interface of the client device or on a user interface of a tethered communication device to send a network packet, then it can be determined that the network interface is being used to perform the action on the account.

If the network interface is being used, then at block 708, an account activity network packet can be transmitted to a target device to perform the action on the account. For example, the action being performed on the account can be a transfer from the account associated with the client device to a target account associated with the target device. The account activity network packet may have a source address corresponding to the network address of the client device, and a destination address corresponding to a network address of the target device. The destination address of the account activity network packet may include a routing field an issuer identifier of an issuer of the target account, and a network interface identifier field having an interface identifier that maps to a target account identifier associated with the target account. Because the relevant accounts can be determined from the source and destination addresses, it is not necessary for the account activity network packet to include the account identifiers of the client and target devices.

At block 710, an activity log network packet can be transmitted to the server computer to update the account of the client device. The activity log network packet may include account activity data associated with the action performed on the account. The server computer can then determine the issuer and the account identifier of the account based on the source address in the packet header of the activity log network packet, and transmit an account update message including the account identifier and processing information based on the account activity data to the issuer. The issuer may then update the account of the client device using the processing information. Because the account of the client device can be determined from the source address of the activity log network packet, it is not necessary for the activity log network packet to include the account identifier of the client device.

Referring back to block 706, if it is determined that the client device is not using the network interface to perform an action on the account, then a determination is made at block 712 as to whether the client device is using the contactless interface of the client device to perform an action on the account. The contactless interface can be, for example, a proximity interface that communicates using a shorter range communication protocol such as near field communications (NFC), Bluetooth, etc. The determination at block 712 can be made, for example, by sensing the presence of a contactless reader of an access device within the proximity of the client device, and interacting with the access device using the contactless interface of the client device. If it is determined that the client device is performing an action on the account using the contactless interface, then at block 714, the token is selected instead of the network address to provide to the access device, and the token is provided to the access device via the contactless interface to perform the action on the account.

If it is determined that the client device is not performing an action on the account using the contactless interface of the network interface, then it is determined that the client device is interacting with an access device using a contact interface of the client device. The contact interface can be, for example, electrical contacts of an integrated circuit chip of the client device, or a magnetic stripe, etc. Then at block 716, the account identifier is selected instead of the network address to provide to the access device, and the account identifier is provided to the access device via the contact interface to perform the action on the account.

Figures 8, 9:
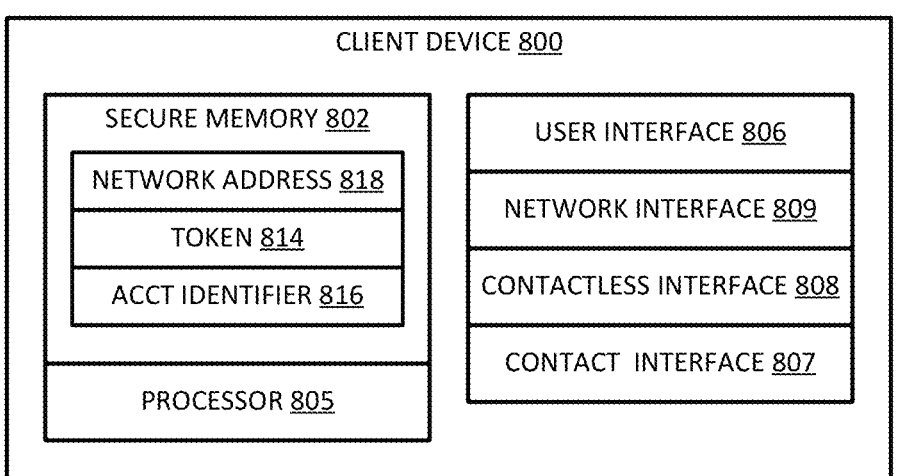
FIG. 8 illustrates a block diagram of a client device, according to some implementations.
FIG. 9 illustrates a block diagram of a communication device, according to some implementations.

FIG. 8 illustrates a block diagram of a client device 800, according to some implementations. Client device 800 can be a portable communication device such as, for example, a network or Internet enabled card. Client device 800 can be used to implement any of the client or target devices described herein. Client device may include a processor 805 coupled to a secure memory 80, a user interface 806, a network interface 809, a contactless interface 808, and/or a contact interface 807.

Processor 805 can be implemented as one or more integrated circuits (e.g., one or more single core or multicore microprocessors and/or microcontrollers), and is used to control the operation of client device 800. Secure memory 802 can be a tamper resistant memory implemented in a secure element (e.g., a SIM card) that is used to store sensitive information such as account identifier 816, a token

814 that acts as a substitute for the account identifier, and a network address 818 that is embedded with an obfuscated account identifier.

User interface 806 may include a display such as a touch screen and/or one or more buttons that can be engaged by a user to control the operation of client device 800. In some implementations, because of the form factor of client device 800, using user interface 806 to control all functionalities of client device 800 can be inconvenient or cumbersome. As such, client device 800 can be tethered to another communication device that may provide a more suitable user interface to control the functionalities of client device 800.

Network interface 809 may include one or more radio frequency transceivers that can be used by client device 800 to communicate with a network. Examples of such radio frequency transceivers may include WiFi or cellular (e.g., 5G, 4G, 3G, etc.) transceivers. Network interface 809 may utilize a network protocol stack to generate network packets to send to the network and to parse network packets received from the network. In some implementations, the network packets utilized by network interface 809 can adhere to a network protocol such as the Internet protocol (e.g., IPv6, IPv4, etc.).

Contactless interface 808 may include one or more specialized RF transceivers (e.g., near field communication (NFC) transceivers, Bluetooth transceivers, etc.) to interact with a contactless reader of an access device in close proximity to client device 800. Contact interface 807 may include electrical contacts and/or a magnetic stripe that can transfer data with a contact reader such as a chip reader or magnetic stripe reader of an access device.

FIG. 9 illustrates a block diagram of a communication device 900, according to some implementations. Communication device 900 can be used to implement any of the communication devices described herein. Communication device 900 may include device hardware 904 coupled to a memory 902. Device hardware 904 may include a processor 905, a communications subsystem 909, and a user interface 906. In some implementations, device hardware 904 may include a display 907 (which can be part of user interface 906). Device hardware 904 may also include a contactless interface 908. Processor 905 can be implemented as one or more integrated circuits (e.g., one or more single core or multicore microprocessors and/or microcontrollers), and is used to control the operation of communication device 200.

Processor 905 can execute a variety of programs in response to program code or computer-readable code stored in memory 902, and can maintain multiple concurrently executing programs or processes. Communications subsystem 909 may include one or more RF transceivers and/or connectors that can be used by communication device 900 to communicate with other devices and/or to connect with external networks. User interface 906 can include any combination of input and output elements to allow a user to interact with and invoke the functionalities of communication device 900. In some implementations, user interface 906 may include a component such as display 907 that can be used for both input and output functions.

Contactless interface 908 may include one or more specialized RF transceivers (e.g., near field communication (NFC) transceivers) to interact with a contactless reader of an access device to conduct a transaction (e.g., payment transaction, access transaction, information exchange, etc.). In secure element based implementations, only a secure element (not shown) may have access to contactless interface 908. In some implementations, contactless interface 908 can be accessed by the mobile OS 914 using specialized APIs 916 without requiring the use of a secure element. In some implementations, display 907 can also be part of contactless interface 908, and is used, for example, to perform transactions using QR codes, bar codes, etc.

Memory 902 can be implemented using any combination of any number of non-volatile memories (e.g., flash memory) and volatile memories (e.g., DRAM, SRAM), or any other non-transitory storage medium, or a combination thereof media. Memory 902 may store an operating system (OS) 914 and an application environment 910 where one or more applications reside including client device application 912 to be executed by processor 905. In some implementations, OS 914 may implement a set of APIs 916 that can be invoked by client device application 912 to access contactless interface 908 to interact with an access device.

Client device application 912 can be an application that interfaces with a client device, and may provide a user interface to control the functionalities of the client device. For example, client device application 912 can be used to access a token or network address of a tethered client device to conduct transactions via communication device 900. In some implementations, access to client device application 912 by a user can be protected by user authentication data such as a password, passcode, PIN, etc. For example, when a user attempts to launch or execute client device application 912, the user may be requested to enter valid user authentication data before the user can access client device application 912. In some implementations, client device application 912 can be used to display account activity associated with the account of a tethered client device. For example, client device application may display a list of past transactions conducted using the account of the client device. Client device application 912 may also display a map highlighting the locations of where the client device has been used to conduct a transaction. In some implementations, client device application 912 can implement all the functionalities of the client device such as storing network address 918, token 914, and/or account identifier 916 of the client device, and generating network packets utilizing network address 918. In such implementations, an external client device can be omitted, and a separate client device need not be tethered to communication device 900. In other words, client device application 912 can be used to implement the client device itself.

The various entities or components described herein may be associated with or operate one or more computer apparatuses to facilitate the functions described herein. Some of the entities or components, including any server or database, may use any suitable number of subsystems to facilitate the functions. Examples of such subsystems or components can be interconnected via a system bus. Additional subsystems may include a printer, keyboard, fixed disk (or other memory comprising computer readable media), monitor, which can be coupled to display adapter, and others. Peripherals and input/output (I/O) devices, which couple to an I/O controller (which can be a processor or other suitable controller), can be connected to the computer system, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer readable medium.

It should be understood that the techniques as described above can be implemented in the form of control logic using computer software (stored in a tangible physical medium) in a modular or integrated manner. Based on the disclosure and teachings provided herein, a person of ordinary skill in the art will know and appreciate other ways and/or methods to implement the techniques using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the techniques will become apparent to those skilled in the art upon review of the disclosure. The scope of the techniques disclosed herein should, therefore, be determined not with reference to the above description, but instead should be determined with reference to the pending claims along with their full scope or equivalents.

One or more features from any embodiment may be combined with one or more features of any other embodiment without departing from the scope of the techniques disclosed herein.

A recitation of "a", "an" or "the" is intended to mean "one or more" unless specifically indicated to the contrary.

All patents, patent applications, publications, and descriptions) mentioned above are herein incorporated by reference in their entirety for all purposes. None is admitted to be prior art.

What is claimed is:

1. A method comprising:

receiving, by a client device, a network address assigned to the client device, wherein the network address assigned to the client device comprises a routing prefix field and a network interface identifier field, the routing prefix field including an issuer identifier of an issuer of an account, and the network interface identifier field including an interface identifier that maps to an account identifier;

transmitting, by the client device, an account activity network packet to a target device to perform an action on the account, the account activity network packet having a source address corresponding to the network address assigned to the client device, and a destination address corresponding to a network address of the target device; and transmitting, by the client device, an activity log network packet to a server computer, the activity log network packet including account activity data associated with the action performed on the account, wherein the server computer determines the issuer and the account identifier of the account based on a source address in a packet header of the activity log network packet, and transmits an account update message including the account identifier and processing information based on the account activity data to the issuer, and wherein the issuer updates the account using the processing information.

2. The method of claim 1, wherein the action performed on the account is a transfer from the account associated with the client device to a target account associated with the target device.

3. The method of claim 2, wherein the destination address of the account activity network packet includes a routing prefix field and a network interface identifier field, and wherein the routing prefix field includes an issuer identifier of an issuer of the target account, and the network interface identifier field includes an interface identifier that maps to a target account identifier associated with the target account.

4. The method of claim 1, wherein the account activity network packet and the activity log network packet do not include the account identifier associated with the client device.

5. The method of claim 1, further comprising:

receiving, by the client device, a token from the server computer in response to the server computer verifying the account identifier, wherein the token is used as a substitute for the account identifier; and storing, by the client device, the token.

6. The method of claim 5, further comprising:

determining, by the client device, that the client device is interacting with an access device using a proximity interface of the client device;

in response to determining that the client device is interacting with the access device using the proximity interface, selecting, by the client device, the token instead of the network address to provide to the access device; and providing, by the client device, the token to the access device via the proximity interface to perform another action on the account.

7. The method of claim 1, further comprising:

determining, by the client device, that the client device is interacting with an access device using a contact interface of the client device;

in response to determining that the client device is interacting with the access device using the contact interface, selecting, by the client device, the account identifier instead of the network address to provide to the access device; and providing, by the client device, the account identifier to the access device via the contact interface to perform another action on the account.

8. The method of claim 7, wherein the access device is a point of sale terminal.

9. The method of claim 8, wherein the client device is a network enabled card.

10. The method of claim 1, wherein the client device is a network enabled card.

11. A client device comprising:

a processor;

a network interface; and a memory storing executable code, which when executed by the processor, causes the client device to implement operations including:

receiving a network address assigned to the client device, wherein the network address assigned to the client device comprises a routing prefix field and a network interface identifier field, the routing prefix field including an issuer identifier of an issuer of an account, and the network interface identifier field including an interface identifier that maps to an account identifier;

transmitting an account activity network packet to a target device to perform an action on the account, the account activity network packet having a source address corresponding to the network address assigned to the client device, and a destination address corresponding to a network address of the target device; and transmitting an activity log network packet to a server computer, the activity log network packet including account activity data associated with the action performed on the account, wherein the server computer determines the issuer and the account identifier of the account based on a source address in a packet header of the activity log network packet, and transmits an account update message including the account identifier and processing information based on the account activity data to the issuer, and wherein the issuer updates the account using the processing information.

12. The client device of claim 11, wherein the action performed on the account is a transfer from the account associated with the client device to a target account associated with the target device.

13. The client device of claim 12, wherein the destination address of the account activity network packet includes a routing prefix field and a network interface identifier field, and wherein the routing prefix field includes an issuer identifier of an issuer of the target account, and the network interface identifier field includes an interface identifier that maps to a target account identifier of the target account.

14. The client device of claim 11, further comprising:

a contactless interface, wherein the operations further include:

receiving a token from the server computer in response to the server computer verifying the account identifier, wherein the token is used as a substitute for the account identifier;

determining that the client device is interacting with a contactless reader of an access device;

in response to determining that the client device is interacting with the contactless reader of the access device, selecting the token instead of the network address to provide to the access device; and providing the token to the access device via the contactless interface to perform another action on the account.

15. The client device of claim 11, further comprising:

a contact interface, wherein the operations further include:

determining that the client device is interacting with a contact reader of an access device;

in response to determining that the client device is interacting with the contact reader of the access device, selecting the account identifier instead of the network address to provide to the access device; and providing the account identifier to the access device via the contact interface to perform another action on the account.

16. The client device of claim 11, wherein the client device is an Internet enabled card.

17. The client device of claim 16, further comprising a user interface.

18. The client device of claim 11, further comprising a user interface.

19. The client device of claim 11, further comprising:

a contactless interface.

20. The client device of claim 11, further comprising:
a contact interface.

* * * * *